(12) United States Patent
Ku et al.

(10) Patent No.: US 7,935,267 B2
(45) Date of Patent: May 3, 2011

(54) ELECTROLYTE SOLUTION FOR HYDROGEN GENERATING APPARATUS AND HYDROGEN GENERATING APPARATUS COMPRISING THE SAME

(75) Inventors: Bosung Ku, Suwon-si (KR); Jae-Hyuk Jang, Seongnam-si (KR); Kyoung-Soo Chae, Suwon-si (KR); Chang-Ryul Jung, Seoul (KR)

(73) Assignee: Samsung Electro-Mechanics Co., Ltd., Suwon, Gyunggi-do (KR)

( * ) Notice: Subject to any disclaimer, the term of this patent is extended or adjusted under 35 U.S.C. 154(b) by 342 days.

(21) Appl. No.: 12/234,424

(22) Filed: Sep. 19, 2008

(65) Prior Publication Data

US 2009/0081499 A1 Mar. 26, 2009

(30) Foreign Application Priority Data

Sep. 20, 2007 (KR) .................. 10-2007-0095612

(51) Int. Cl.
*H01G 9/035* (2006.01)
*H01G 9/022* (2006.01)
*C25B 9/00* (2006.01)
*H01M 8/06* (2006.01)

(52) U.S. Cl. ........ 252/62.2; 204/242; 204/267; 204/270; 204/278; 429/479; 429/483; 429/490; 429/502; 429/505

(58) Field of Classification Search ................ 252/62.2; 204/242, 267, 270, 278; 429/418, 479, 483, 429/490, 502, 505
See application file for complete search history.

(56) References Cited

U.S. PATENT DOCUMENTS

| | | | | |
|---|---|---|---|---|
| 4,240,885 A | * | 12/1980 | Suciu et al. | 205/455 |
| 2006/0249393 A1 | * | 11/2006 | Ghosh et al. | 205/639 |
| 2008/0210553 A1 | * | 9/2008 | Gil et al. | 204/252 |
| 2008/0220297 A1 | * | 9/2008 | Sarata et al. | 429/19 |
| 2008/0318104 A1 | * | 12/2008 | Ku et al. | 429/29 |
| 2009/0029206 A1 | * | 1/2009 | Jung et al. | 429/19 |
| 2009/0324452 A1 | * | 12/2009 | Salinas et al. | 422/162 |

* cited by examiner

*Primary Examiner* — Bruce F Bell
(74) *Attorney, Agent, or Firm* — Christensen O'Connor Johnson Kindness PLLC

(57) ABSTRACT

The invention provides an electrolyte solution for hydrogen generating apparatus including water; at least one ionizing compound; and at least one cation exchange resin, as well as a hydrogen generating apparatus that includes the electrolyte solution. The electrolyte solution for hydrogen generating apparatus according to the invention can increase the time and amount of hydrogen generation by reducing an amount of metal hydroxide generation.

19 Claims, 6 Drawing Sheets

US 7,935,267 B2

ELECTROLYTE SOLUTION FOR HYDROGEN GENERATING APPARATUS AND HYDROGEN GENERATING APPARATUS COMPRISING THE SAME

CROSS-REFERENCE TO RELATED APPLICATION

This application claims the benefit of Korean Patent Application No. 10-2007-0095612 filed with the Korean Intellectual Property Office on Sep. 20, 2007, the disclosures of which are incorporated herein by reference in its entirety.

BACKGROUND

1. Technical Field

The present invention relates to an electrolyte solution for hydrogen generating apparatus and a hydrogen generating apparatus including the electrolyte solution.

2. Description of the Related Art

A fuel cell refers to an energy conversion apparatus that directly converts oxygen in the air and hydrogen (which can be obtained from pure hydrogen or hydrogen contained in hydrocarbons such as methanol or natural gas) into electrical energy by an electrochemical reaction.

FIG. 1 illustrates the basic operational principle of a fuel cell. Referring to FIG. 1, a fuel cell 10 may include a fuel electrode 11 as an anode and an air electrode 13 as a cathode. The fuel electrode 11 receives hydrogen molecular ($H_2$). The hydrogen is dissociated at the fuel electrode to form hydrogen ions ($H^+$) and electrons ($e^-$).

The hydrogen ions ($H^+$) move toward the air electrode 13 via a membrane 12 which is an electrolyte layer. The electrons move through an external circuit 14 to generate an electric current. The hydrogen ions and the electrons are combined with oxygen from the air at the air electrode 13 to generate water. The fuel electrode 11 and the air electrode 13 are disposed in between the electrolyte membrane to form a membrane electrode assembly (MEA).

The following Reaction Scheme 1 explains the above mentioned chemical reactions:

Fuel electrode 11: $H_2 \rightarrow 2H^+ + 2e^-$

Air electrode 13: $\frac{1}{2} O_2 + 2H^+ + 2e^- \rightarrow H_2O$

Overall reaction: $H_2 + \frac{1}{2} O_2 \rightarrow H_2O$         [Reaction Scheme 1]

In short, the fuel cell 10 functions as a battery since the electrons dissociated from the fuel electrode 11 generate current, moving through the external circuit. Such a fuel cell 10 not only is a pollution-free power because it has no noxious emissions such as SOx, NOx, etc., but also produces a small amount of carbon dioxide. Also, the fuel cell device has some advantages, such as low noise and vibration-free and so on.

In order to obtain a high-performance fuel cell, hydrogen may be used as the fuel. In particular, a micro fuel cell may advantageously be applied as a power source in portable electronic devices, such as cell phones and laptop computers, etc. A type of fuel cell suitable for the micro fuel cell is a polymer electrolyte membrane fuel cell (PEMFC), which operates at a relatively low temperature and has a high output density, and which is being thus actively developed.

Meanwhile, stable hydrogen production and supply thereof is the most challenging technical problem to be solved so as to commercialize the fuel cells. A hydrogen storage tank, generally known as the hydrogen generating apparatus, has been used to solve these problems. However, the tank occupies a large space and should be kept with special care.

In order to avoid such drawbacks associated with the known apparatus, fuels such as methanol and formic acid, permitted to be brought into an airplane by International Civil Aviation Organization (ICAO), are reformatted into hydrogen; methanol, ethanol, or formic acid is directly used as a fuel in the fuel cell.

However, the former case requires a high reforming temperature and a complicate system, consumes driving power, and contains impurities ($CO_2$, CO) besides pure hydrogen molecules. The latter case deteriorates power density due to a low rate of a chemical reaction at the anode and a cross-over of hydrocarbons through the membrane.

Besides, hydrogen generating methods for PEMFC are as follows: oxidation of aluminum, hydrolysis of metal borohydride ($BH_4$), reaction on a metal electrode and so on. Among them, the preferable method for efficiently controlling a generation rate of hydrogen is by using the metal electrode.

However, a hydrogen gas flow rate rapidly increases and thus causes water inside a reactor to overflow when the reaction on the metal electrode is carried out continuously. Further, a metal hydroxide is produced as a by-product which exists in a slurry state in a reactor due to its low water solubility and may deteriorate the hydrogen generation efficiency.

Thus, the need is increasing for a hydrogen generating apparatus, which can resolve the problems in generating hydrogen using the metal electrode and generate hydrogen efficiently.

SUMMARY

An aspect of the invention is to provide an electrolyte solution for a hydrogen generating apparatus and a hydrogen generating apparatus including the electrolyte solution, with which pure hydrogen can be produced.

Another aspect of the invention is to provide a fuel cell system that utilizes the hydrogen generating apparatus.

One aspect of the invention provides an electrolyte solution for a hydrogen generating apparatus that includes water, at least one ionizing compound, and at least one cation exchange resin.

In one embodiment of the invention, the cation exchange resin may be a polymer resin having a cation exchange group, and wherein the cation exchange group may be selected from the group consisting of a sulfonic acid group, a carboxylic acid group, a phosphoric acid group, and a phosphonic acid group.

In another embodiment of the invention, the cation exchange resin may be selected from the group consisting of styrenic strongly acidic cation exchange resin with sulfonic acid groups, styrenic weakly acidic cation exchange resin with carboxylic groups, acrylic weakly acidic cation exchange resin with carboxylic groups and mixtures thereof. In particular, the styrenic strongly acidic cation exchange resin may be a styrene-divinylbenzene copolymer with sulfonic acid groups.

The cation exchange resin may be added to the electrolyte solution in an amount ranging from about 20 to about 40 weight % based on the total weight of the electrolyte solution.

The ionizing compound may be selected from the group consisting of lithium chloride, potassium chloride, sodium chloride, calcium chloride, potassium nitrate, sodium nitrate, potassium sulfate, sodium sulfate, and mixtures thereof.

Another aspect of the invention provides a hydrogen generating apparatus that includes an electrolyzer, which contains an electrolyte solution of water, at least one ionizing compound, and at least one cation exchange resin; a first metal electrode that is disposed in the electrolyzer, is immersed in the electrolyte solution, and generates electrons; and a second metal electrode that is disposed in the electrolyzer, is immersed in the electrolyte solution, and generates hydrogen gas by receiving the electrons.

In one embodiment of the invention, the electrolyzer may further include a container for holding the cation exchange resin.

In another embodiment of the invention, the cation exchange resin may be coated on the inner wall surface of the electrolyzer to be in contact with the water.

The hydrogen generating apparatus can be combined with a fuel cell to supply hydrogen to the fuel cell.

At least two of each of the first metal electrode and the second metal electrode can be disposed in the electrolyzer.

Yet another aspect of the invention provides a fuel cell system including the hydrogen generating apparatus according to the invention; and a membrane electrode assembly (MEA) that is provided with hydrogen generated from the hydrogen generating apparatus and produces direct electric current by converting a chemical energy of the hydrogen into an electric energy.

As set forth in certain aspects of the invention, by using an electrolyte solution for a hydrogen generating apparatus, which includes water, at least one ionizing compound, and at least one cation exchange resin, the rate of hydrogen generation can be controlled, and the amount of hydrogen generated, as well as the hydrogen generation lasting time, can be increased.

These and other features, aspects, and advantages of the present invention will become better understood with regard to the following description, appended claims, and accompanying drawings or may be learned by practice of the invention.

DETAILED DESCRIPTION

Figure 1:
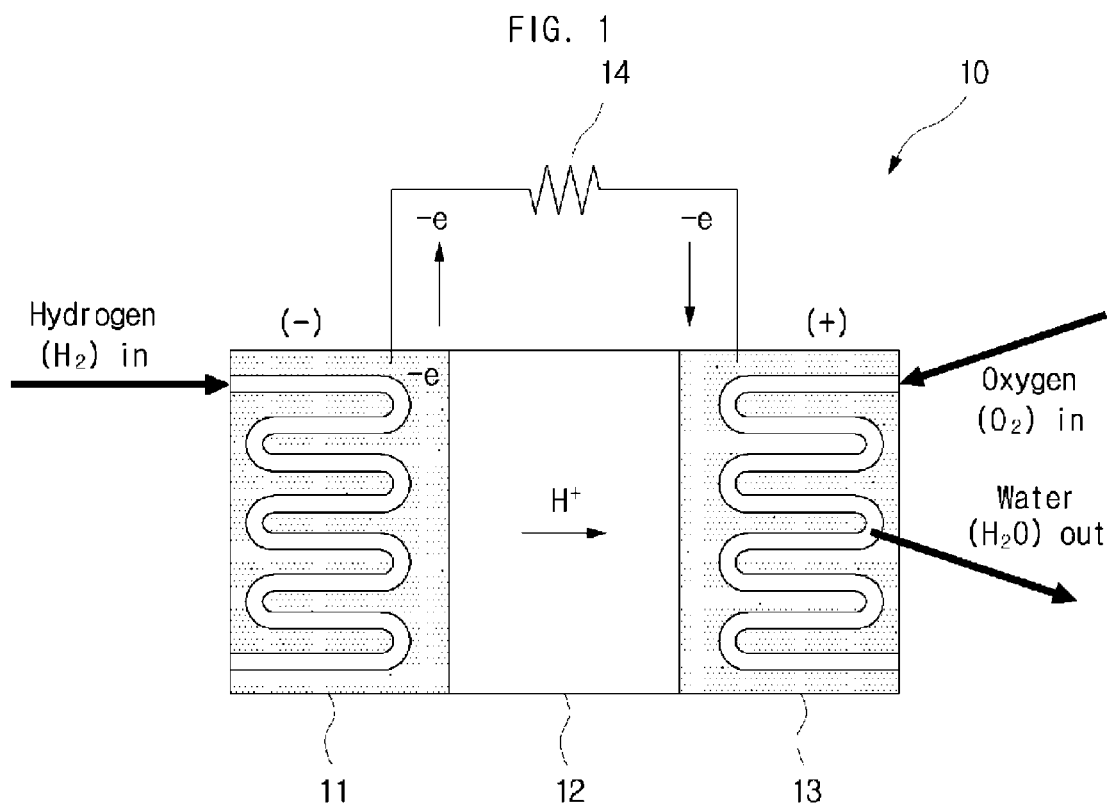
FIG. 1 illustrates the basic operational principle of a fuel cell.
Figure 2:
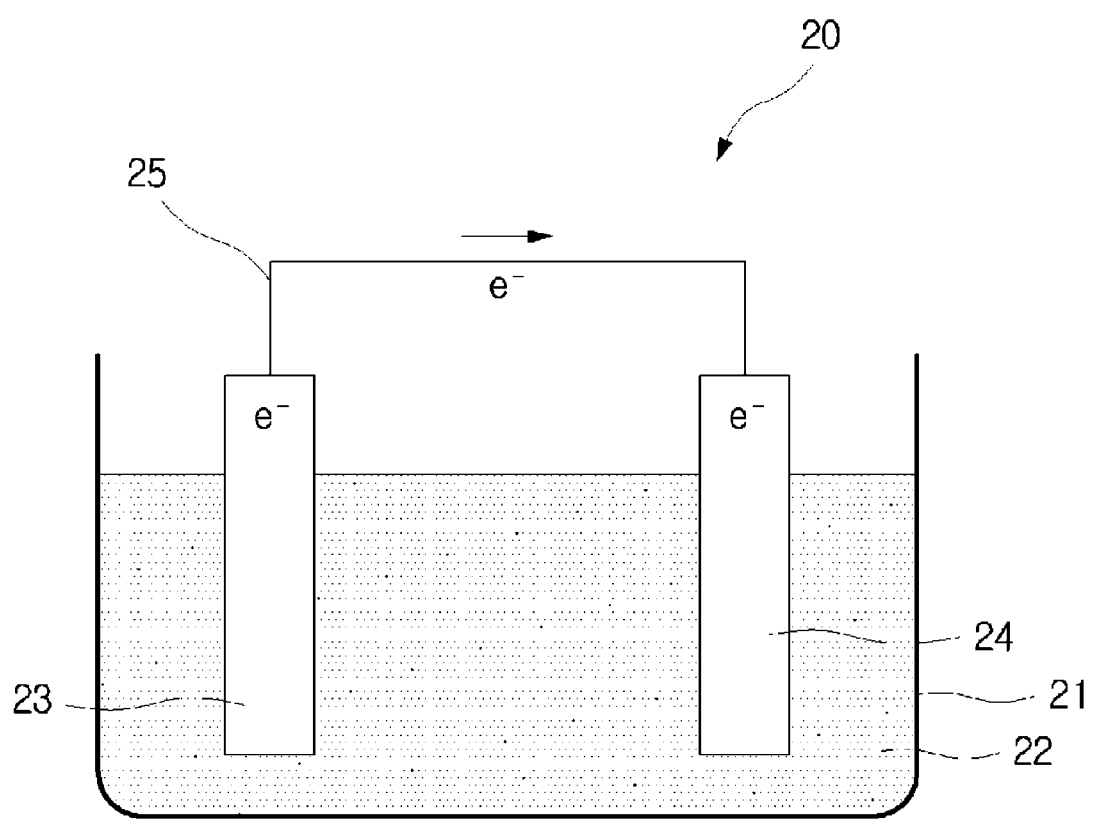
FIG. 2 is a schematic cross-sectional view of a hydrogen generating apparatus according to one embodiment of the invention.

FIG. 2 is a schematic cross-sectional view of a hydrogen generating apparatus according to an embodiment of the present invention. The hydrogen generating apparatus 20 according to this embodiment includes an electrolyzer 21, a first metal electrode 23, and a second metal electrode 24.

The description below focuses on an exemplary case where the first electrode 23 is composed of magnesium (Mg) and the second electrode 24 is composed of stainless steel.

Referring back to FIG. 2, the electrolyzer 21 is filled with an electrolyte solution 22. The electrolyzer 21 can include the first electrode 23 and the second electrode 24, which may be immersed in the electrolyte solution entirely or partly.

The first electrode 23 is an active electrode, where the magnesium (Mg) is oxidized into a magnesium ion ($Mg^{2+}$) releasing two electrons, due to the difference of ionization energy between the magnesium and the water ($H_2O$). The resulting electrons move to the second electrode 24 through an electric wire 25.

The second electrode 24 is an inactive electrode, where the water molecules receive the electrons moved from the first electrode 23 and is decomposed into hydrogen molecules.

The following Reaction Scheme 2 explains the above mentioned chemical reactions:

First electrode 23: $Mg \rightarrow Mg^{2+} + 2e^-$

Second electrode 24: $2H_2O + 2e^- \rightarrow H_2 + 2(OH)^-$

Overall reaction: $Mg + 2H_2O \rightarrow Mg(OH)_2 + H_2$     [Reaction Scheme 2]

As the above-mentioned hydrogen generation reaction is carried out, the water in the electrolyzer could be overflowed due to a rapid increase in hydrogen flow rate. So, it may require controlling the hydrogen generation rate.

Besides as a result of the Reaction Scheme 2, the magnesium hydroxide ($Mg(OH)_2$) is produced of which water solubility is no more than about 12 mg/L. So, the magnesium hydroxide exists in a slurry state in the electrolyzer when the reaction is carried out continuously. The magnesium hydroxide slurry, thus, inhibits water movement, which may result in deterioration of efficient hydrogen generation.

An electrolyte solution for the hydrogen generating apparatus according to an embodiment of the invention may include at least one ionizing compound and/or at least one cation exchange resin, in order to control the hydrogen generation rate and to prevent from the production of the magnesium hydroxide.

The ionizing compound included in the electrolyte solution of the invention increases a conductivity of the electrolyte solution. Examples of the ionizing compound may include, but not limited to, lithium chloride, potassium chloride, sodium chloride, calcium chloride, potassium nitrate, sodium nitrate, potassium sulfate, sodium sulfate, and mixtures thereof. Among them, potassium chloride may be more preferably used. Also, the concentration of the ionizing compound may be about 5 to about 40 weight %, but is not limited to this.

As the cation exchange resin, a polymer resin having a cation exchange group may be used, and the cation exchange group may be selected from the group consisting of a sulfonic acid group, a carboxylic acid group, a phosphoric acid group, and a phosphonic acid group.

Specifically, the cation exchange resin may be selected from the group consisting of strongly acidic cation exchange resin with sulfonic acid groups, styrenic weakly acidic cation exchange resin with carboxylic groups, acrylic weakly acidic cation exchange resin with carboxylic groups and mixtures thereof, but the invention is not thus limited. In certain embodiments of the invention, a styrene-divinylbenzene copolymer with sulfonic acid groups may be more preferably used.

Specific examples of the cation exchange resin include Amberlyst 15™ (Rohm & Hass), Amberjet 1500H™ (Rohm & Hass), Amberjet 1200H™ (Rohm & Hass), Dowex50™ (Dow Chemical), Dianon SK1B™ (Mitsubushi) and Lewatit 100MB™ (Bayer) and so on.

As described above, the cation exchange resin has a type of functional group such as a strong acid sulfonic acid ($SO_3^-H^+$)

or a weak carboxylic acid ($COO^-H^+$). The functional group is attached on the outer surface of a porous polymer such as a styrene, so that it is possible that the functional group is interchanged with a magnesium ion in the electrolyte solution.

Figure 3:
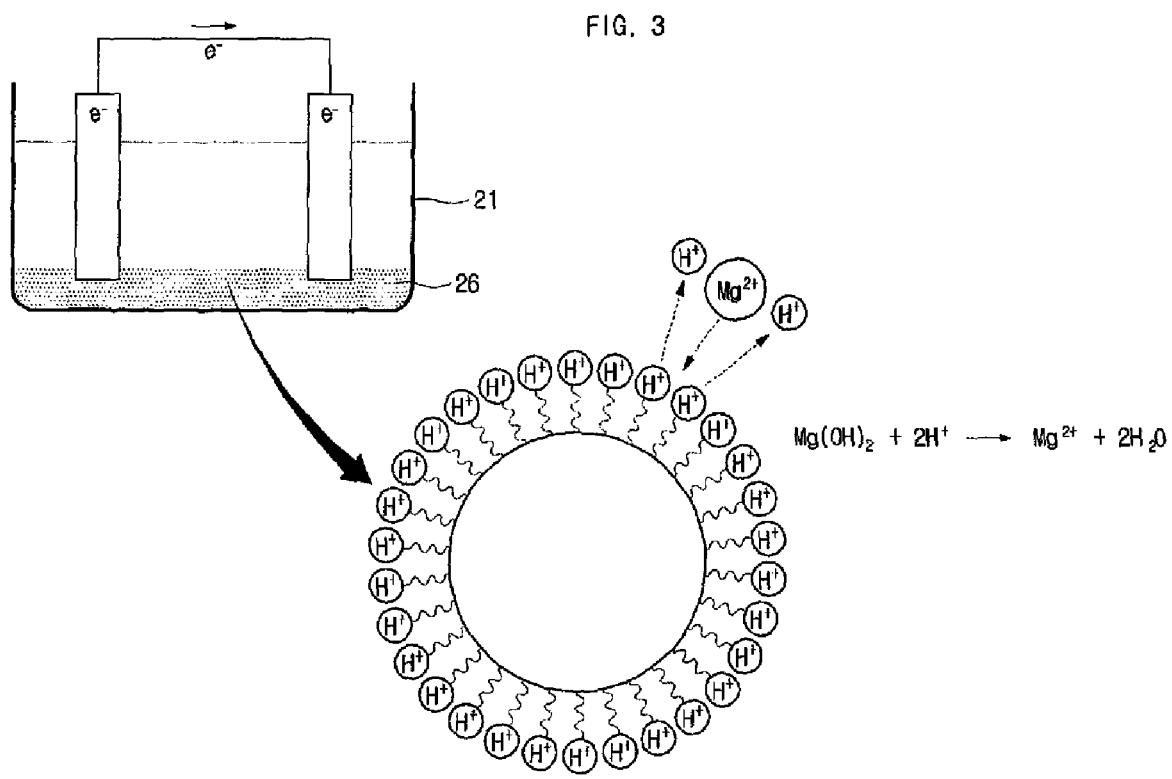
FIG. 3 is a schematic cross-sectional view of a hydrogen generating apparatus according to another embodiment of the invention.

To be more specific as shown in FIG. 3, hydrogen ions of the cation exchange resin 26 are interchanged with the magnesium ions in the electrolyte solution, so that the magnesium ions are combined with the cation exchange resin. Besides, the hydrogen ions released from the cation exchange resin react with an insoluble magnesium hydroxide compound to produce water and magnesium ions, repeatedly. This represented as a chemical reaction is as shown in the following Reaction Scheme 3:

$Mg(OH)_2 + 2H^+ \rightarrow Mg^{2+} + 2H_2O$  [Reaction Scheme 3]

From Reaction Scheme 3 shown above and FIG. 3, it is noted that the generation of magnesium hydroxide is reduced since the magnesium ions in the electrolyte solution are combined to the cation exchange resin, and/or the hydrogen ions released from the cation exchange resin are reacted with the magnesium hydroxide. Thus, it is observed that the cation exchange resin, in certain embodiments of the invention, reduces the generation of magnesium hydroxide, which is one of the factors that inhibits hydrogen generation, and increases the hydrogen generation efficiency.

The cation exchange resin may be added to the electrolyte solution in an amount ranging from about 20 to about 40 weight % based on the total weight of the electrolyte solution, and more preferably ranging from 30 to 35 weight %. If the amount of the cation exchange resin added to the electrolyte solution is less than 20 weight %, the reaction efficiency may be lowered. On the other hand, if the cation exchange resin exceeds 40 weight %, there may be a problem that additional water is supplied to the electrolyzer In certain embodiments of the invention, the particle size of the cation exchange resin may be from about 1 to 0.4 mm (about from 13 to 80 mesh), and more preferably ranging from 1 to 0.25 mm.

In case of a hydrogen generating apparatus that dose not use the ionizing compound and/or the cation exchange resin, the flow rate of hydrogen increases rapidly such that there is overflowing of the water in the reactor. According to the invention, the ionizing compound and/or the cation exchange resin serve to regulate the hydrogen generation rate.

In certain embodiments of the invention, a stabilizing agent may further be added. In embodiments of the invention, materials (e.g. sodium hydroxide, etc.) may be used that are well known in the field of art as stabilizing agents.

In one aspect, the invention can provide a hydrogen generating apparatus including an electrolyzer filled with an electrolyte solution including water, at least one ionizing compound, and at least one cation exchange resin described above. Particularly, it includes an electrolyzer filled with an electrolyte solution having water, at least one ionizing compound, and at least one cation exchange resin; a first metal electrode that is disposed in the electrolyzer, is immersed in the electrolyte solution, and generates electrons; and a second metal electrode that is disposed in the electrolyzer, is immersed in the electrolyte solution, and generates hydrogen gas by receiving the electrons.

In one embodiment of the invention, the cation exchange resin 26 is not soluble in water, thus the resin may be directly added to the electrolyte solution to exist in an insoluble form (FIG. 3).

In another embodiment of the invention, the cation exchange resin may be added to the electrolyte solution being held in a container. Specifically, as shown in FIG. 4, the container 30 for holding the cation exchange resin includes a main body frame 33 which has at least one hole 33a for placing the cation exchange resin; shield frames, 31a, 31b, that are attached to the lateral side of the main frame, and wherein the shield frame is combined with a mesh, 32a, 32b to, cover the shield frame.

The particle size of the cation exchange resin depends on the size of the mesh. In certain embodiments of the invention, the particle size of the cation exchange resin may be from about 1 to 0.4 mm (about from 13 to 80 mesh), and more preferably ranging from 1 to 0.25 mm.

When the container having the cation exchange resin is added to the electrolyte solution, the magnesium ions flowed into the container through the mesh are selectively interchanged with the hydrogen ions of the cation exchange resin. Further, the hydrogen ions released from the cation exchange resin may react with magnesium hydroxide.

Figure 4:
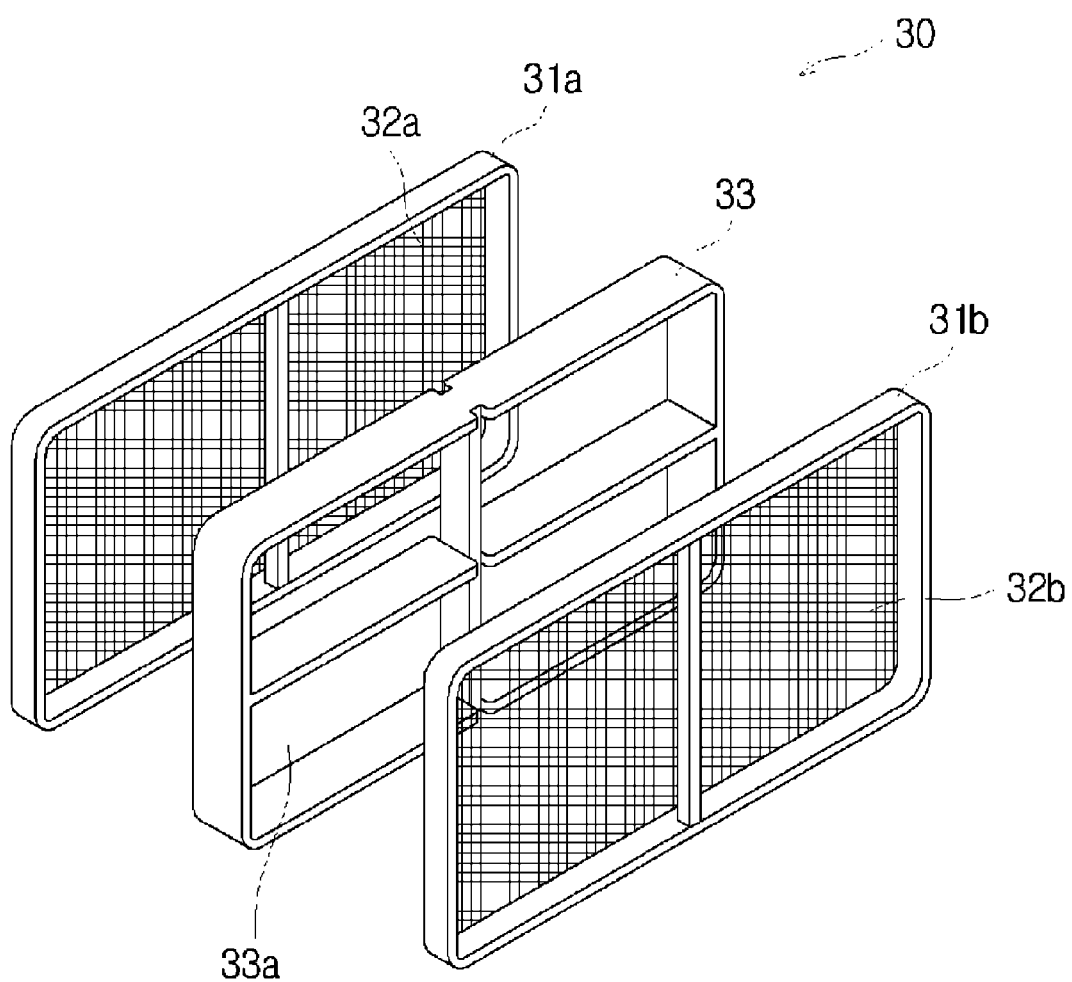
FIG. 4 is a container for holding a cation exchange resin according to another embodiment of the invention.

FIG. 4 shows the container as a rectangular form, which is intended for illustrative purpose and various types of container are available.

Figure 5:
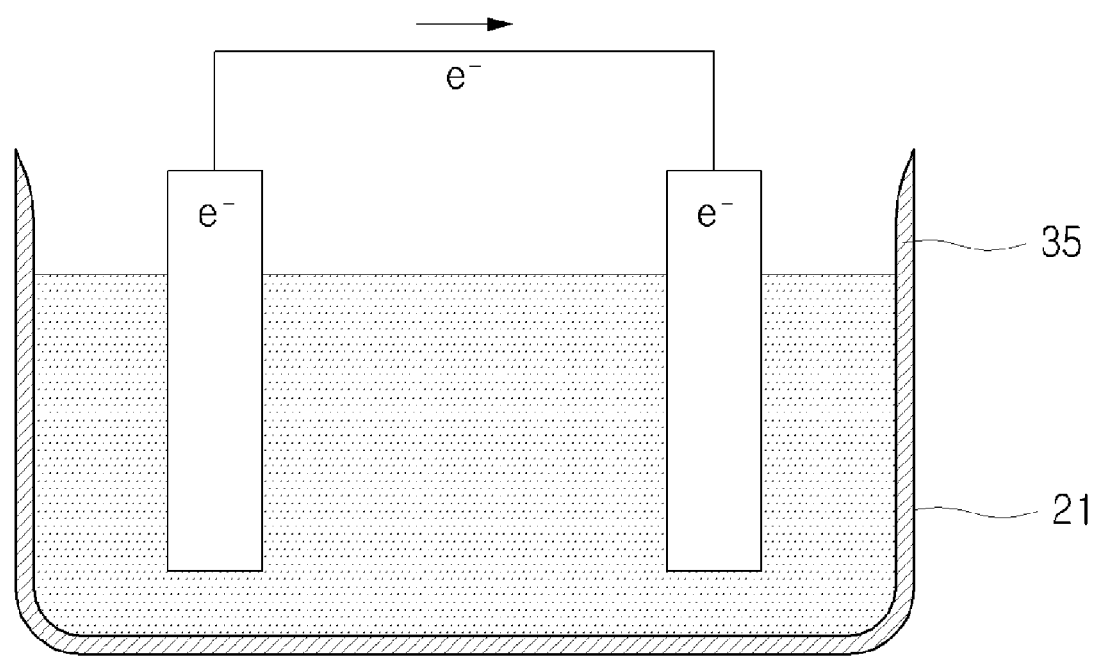
FIG. 5 is a schematic cross-sectional view of a hydrogen generating apparatus on which a cation exchange resin is coated according to another embodiment of the invention.

In another embodiment of the invention, the cation exchange resin 35 may be coated on the inner wall surface of the electrolyzer to be in contact with the water (FIG. 5). There is an advantage that increases ion-exchange efficiency when the cation exchange resin is coated on the inner wall surface of the electrolyzer. In the invention, the coating of the cation exchange resin refers to physical absorption by using polymer affinity. In certain embodiments of the invention, the cation exchange resin may be coated on the inner wall surface of the electrolyzer by a method well known in the field of art.

The first electrode 23 can be composed of a metal with relatively a high ionization tendency such as iron (Fe), aluminum (Al), zinc (Zn), etc, besides the magnesium. And, the second electrode 24 can be composed of a metal with relatively a lower ionization tendency, compared to the first electrode 23, such as platinum (Pt), copper (Cu), gold (Au), silver (Ag), iron (Fe), etc, besides the stainless steel.

The hydrogen generating apparatus of the invention may include at least two of the first electrode 23 and/or the second electrode 24 independently. As the numbers of the first electrode 23 and/or the second electrode 24 are increased, the amount of the hydrogen generated during the same time becomes larger so that it can take a shorter time to generate the hydrogen as much as demanded.

The hydrogen generating apparatus can be combined with a fuel cell to supply hydrogen to the fuel cell. The fuel cell of the invention is, but not limited to, a polymer membrane fuel cell such as the polymer electrolyte membrane fuel cell.

Also, the hydrogen generating apparatus according to the invention can be used in a fuel cell system including a membrane electrode assembly (MEA) that is provided with hydrogen generated from the hydrogen generating apparatus and produces direct electric current by converting a chemical energy of the hydrogen into an electric energy.

The invention may be better understood by reference to the following examples which are intended for the purpose of illustration and are not to be construed as in any way limiting the scope of the present invention, which is defined in the claims appended hereto.

EXAMPLES

The hydrogen generation apparatus of generating 32 cc/min hydrogen according to the invention was prepared with the following conditions:

First metal electrode 23: 3 g of magnesium

Second metal electrode 24: stainless steel
Distance between electrodes: 0.5 mm
Number of electrodes: three magnesium electrodes, three stainless steel electrodes
Electrode connection method: serial connection
Volume of aqueous electrolyte solution: 20 cc
Size of an electrode: 40 mm×60 mm×1 mm,
and potassium chloride, styrene-divinylbenzene copolymer with a particle size of 1 mm (Amberjet 1500H™, Rohm & Hass) and sodium hydroxide were added to the hydrogen generation apparatus as shown in Table 1 and the electrochemical reaction was accomplished. Then, the resulting amount of hydrogen generated was measured by a mass flow meter (MFM) and hydrogen generation (32 cc/min) lasting time (min) was measured. The result is shown in Table 1 and FIG. 6.

TABLE 1

| Category | Example 1 | Example 2 | Example 3 | Comparative Example 1 |
|---|---|---|---|---|
| potassium chloride (weight %) | 30 | 30 | 30 | 30 |
| Amberjet 1500H (weight %) | 20 | 30 | 40 | 0 |
| sodium hydroxide (weight %) | — | 1 | — | — |
| hydrogen generation (32 cc/min) lasting Time (min) | 140 | 150 | 145 | 110 |

Figure 6:
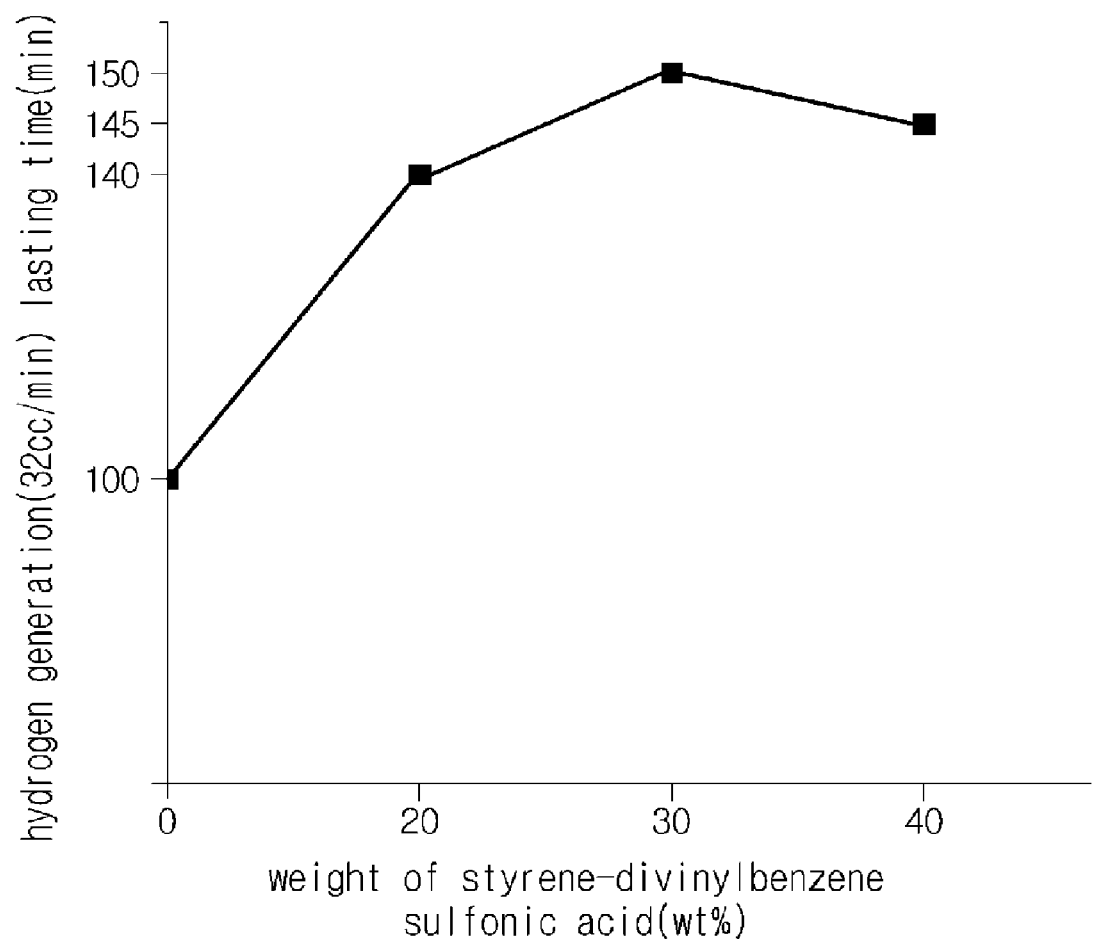
FIG. 6 is a graph showing a hydrogen generation lasting time according to an example and a comparative example of the invention.

As shown in Table 1 and FIG. 6, it is noted that for the electrolyte solutions of Examples 1-3, the time and amount of hydrogen generation were increased, compared with the solution of Comparative Example. Also, with the electrolyte solutions of Examples 1 to 3, the flow rate of hydrogen does not rapidly increase, so that it is possible to control the hydrogen generation rate and thus produce hydrogen in a stable manner.

The present invention can be easily carried out by an ordinary skilled person in the art. Many modifications and changes may be deemed to be with the scope of the present invention as defined in the following claims.

What is claimed is:

1. An electrolyte solution for a hydrogen generating apparatus, the electrolyte solution comprising:
   water;
   at least one ionizing compound; and
   at least one cation exchange resin;
   wherein the cation exchange resin is selected from the group consisting of styrenic strongly acidic cation exchange resin with sulfonic acid groups, styrenic weakly acidic cation exchange resin with carboxylic groups, acrylic weakly acidic cation exchange resin with carboxylic groups and mixtures thereof.

2. The electrolyte solution for hydrogen generating apparatus according to claim 1, wherein the cation exchange resin is a polymer resin having a cation exchange group which is selected from the group consisting of a sulfonic acid group, a carboxylic acid group, a phosphoric acid group, and a phosphonic acid group.

3. The electrolyte solution for hydrogen generating apparatus according to claim 1, wherein the styrenic strongly acidic cation exchange resin is a styrene-divinylbenzene copolymer with sulfonic acid groups.

4. The electrolyte solution for hydrogen generating apparatus according to claim 1, wherein the cation exchange resin is added in an amount ranging from about 20 to about 40 weight % based on the total weight of the electrolyte solution.

5. The electrolyte solution for hydrogen generating apparatus according to claim 1, wherein the particle size of the cation exchange resin is from about 1 to 0.4 mm.

6. The electrolyte solution for hydrogen generating apparatus according to claim 1, wherein the ionizing compound is selected from the group consisting of lithium chloride, potassium chloride, sodium chloride, calcium chloride, potassium nitrate, sodium nitrate, potassium sulfate, sodium sulfate, and mixtures thereof.

7. A hydrogen generating apparatus comprising:
   an electrolyzer filled with an electrolyte solution comprising water, at least one ionizing compound, and at least one cation exchange resin;
   wherein the cation exchange resin is selected from the group consisting of styrenic strongly acidic cation exchange resin with sulfonic acid groups, styrenic weakly acidic cation exchange resin with carboxylic groups, acrylic weakly acidic cation exchange resin with carboxylic groups and mixtures thereof;
   a first metal electrode that is disposed in the electrolyzer, is immersed in the electrolyte solution, and generates electrons; and
   a second metal electrode that is disposed in the electrolyzer, is immersed in the electrolyte solution, and generates hydrogen gas by receiving the electrons.

8. The hydrogen generating apparatus according to claim 7, wherein the electrolyzer further comprises a container for holding the cation exchange resin.

9. The hydrogen generating apparatus according to claim 8, wherein the container for holding the cation exchange resin comprises:
   a main body frame which have at least one hole for placing the cation exchange resin; and
   shield frames that are attached to the lateral side of the main frame;
   wherein the shield frame is combined with a mesh to cover the shield frame.

10. The hydrogen generating apparatus according to claim 7, wherein the cation exchange resin is a polymer resin having a cation exchange group which is selected from the group consisting of a sulfonic acid group, a carboxylic acid group, a phosphoric acid group, and a phosphonic acid group.

11. The hydrogen generating apparatus according to claim 7, wherein the styrenic strongly acidic cation exchange resin is a styrene-divinylbenzene copolymer with sulfonic acid groups.

12. The hydrogen generating apparatus according to claim 7, wherein the cation exchange resin is added in an amount ranging from about 20 to about 40 weight % based on the total weight of the electrolyte solution.

13. The hydrogen generating apparatus according to claim 7, wherein the particle size of the cation exchange resin is from about 1 to 0.4 mm.

14. The hydrogen generating apparatus according to claim 7, wherein the ionizing compound is selected from the group consisting of lithium chloride, potassium chloride, sodium chloride, calcium chloride, potassium nitrate, sodium nitrate, potassium sulfate, sodium sulfate, and mixtures thereof.

15. The hydrogen generating apparatus according to claim 7, wherein the first metal electrode is composed with magnesium.

16. The hydrogen generating apparatus of claim 7, wherein the hydrogen generating apparatus is combined with a fuel cell to supply hydrogen to the fuel cell.

17. The hydrogen generating apparatus of claim 7, wherein at least two of each of the first metal electrode and the second metal electrode are disposed in the electrolyzer.

18. A fuel cell system comprising:

a hydrogen generating apparatus of claim 7; and a membrane electrode assembly (MEA) that is provided with hydrogen generated from the hydrogen generating apparatus and produces direct electric current by converting a chemical energy of the hydrogen into an electric energy.

19. The hydrogen generating apparatus comprising:

an electrolyzer filled with an electrolyte solution comprising water, at least one ionizing compound, and at least one cation exchange resin;

a first metal electrode that is disposed in the electrolyzer, is immersed in the electrolyte solution, and generates electrons;

a second metal electrode that is disposed in the electrolyzer, is immersed in the electrolyte solution, and generates hydrogen gas by receiving the electrons; and wherein the cation exchange resin is coated on the inner wall surface of the electrolyzer to be in contact with the water.

\* \* \* \* \*